(12) United States Patent
Chen et al.

(10) Patent No.: US 11,314,443 B2
(45) Date of Patent: Apr. 26, 2022

(54) METHOD, DEVICE, AND COMPUTER PROGRAM PRODUCT FOR MANAGING IMAGE OF CONTAINER

(71) Applicant: EMC IP Holding Company LLC, Hopkinton, MA (US)

(72) Inventors: Si Chen, Shanghai (CN); Pengfei Wu, Shanghai (CN); Zhenzhen Lin, Shanghai (CN); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 16/983,244

(22) Filed: Aug. 3, 2020

(65) Prior Publication Data
US 2021/0405912 A1 Dec. 30, 2021

(30) Foreign Application Priority Data
Jun. 29, 2020 (CN) .......................... 202010610469.2

(51) Int. Cl.
*G06F 3/06* (2006.01)
*G06F 8/61* (2018.01)
*G06F 9/455* (2018.01)

(52) U.S. Cl.
CPC ............ *G06F 3/0653* (2013.01); *G06F 3/067* (2013.01); *G06F 3/0614* (2013.01); *G06F 3/0652* (2013.01); *G06F 3/0659* (2013.01); *G06F 3/0662* (2013.01); *G06F 8/63* (2013.01); *G06F 9/45533* (2013.01)

(58) Field of Classification Search
None
See application file for complete search history.

(56) References Cited

U.S. PATENT DOCUMENTS

| 10,659,329 | B1 | 5/2020 | Zhao et al. | |
| 10,698,925 | B1 | 6/2020 | Zhao et al. | |
| 2017/0177877 | A1* | 6/2017 | Suarez | .................. G06F 16/188 |
| 2017/0220329 | A1* | 8/2017 | Yang | ......................... G06F 8/60 |

(Continued)

OTHER PUBLICATIONS

P. Maymounkov et al., "Kademlia: A Peer-to-Peer Information System Based on the XOR Metric," Revised Papers from the First International Workshop on Peer-to-Peer Systems (ISTPS), Mar. 7-8, 2002, vol. 2429, pp. 53-65.

(Continued)

*Primary Examiner* — Kaushikkumar M Patel
(74) *Attorney, Agent, or Firm* — Ryan, Mason & Lewis, LLP

(57) ABSTRACT

In a method for managing an image of a container in a host device, a first image of a first container is received, wherein the first image includes a first set of image layers for implementing a first set of services of the first container respectively. The first image is loaded to deploy the first container at the host device. Based on an attribute of an image layer in the first set of image layers, an expiration time is set for the image layer. In response to determining that the expiration time is reached, the image layer is deleted from the host device. Stored image layers can be reused to reduce the transmission bandwidth for remotely downloading the image layers. A corresponding device and a corresponding computer program product are provided.

20 Claims, 9 Drawing Sheets

(56) References Cited

U.S. PATENT DOCUMENTS

| | | | | |
|---|---|---|---|---|
| 2018/0189121 | A1* | 7/2018 | Jobi | G06F 9/5016 |
| 2018/0189176 | A1* | 7/2018 | Jobi | G06F 16/162 |
| 2018/0246812 | A1* | 8/2018 | Aronovich | G06F 12/0871 |
| 2019/0095441 | A1* | 3/2019 | Scrivano | G06F 16/51 |
| 2019/0347121 | A1* | 11/2019 | Luo | G06F 3/0644 |

OTHER PUBLICATIONS

Docker Inc., "Docker Hub," https://hub.docker.com, Apr. 9, 2020, 5 pages.

* cited by examiner

METHOD, DEVICE, AND COMPUTER PROGRAM PRODUCT FOR MANAGING IMAGE OF CONTAINER

RELATED APPLICATION(S)

The present application claims priority to Chinese Patent Application No. 202010610469.2, filed Jun. 29, 2020, and entitled "Method, Device, and Computer Program Product for Managing Image of Container," which is incorporated by reference herein in its entirety.

FIELD

Embodiments of the present disclosure relate to container management, and more particularly, to a method, a device, and a computer program product for managing an image of a container in a host device.

BACKGROUND

With the development of computer technologies, "container" technologies have been widely used in many industries. Currently, more and more applications are developed based on the container technologies. The container here is a technology for encapsulating services, which allows developers to encapsulate various services associated with applications. Further, various types of containers can be used as modules for subsequent development, for example, applications can be developed based on one or more containers.

An image of a container can be downloaded from a server that provides the container. The image can be loaded at the host device to deploy the container at the host device. Depending on the function of the container, the size of the image of the container may vary greatly, for example, it may vary from tens of kilobytes (KB) to several gigabytes (GB). Therefore, the storage and download of the image will result in corresponding costs of storage resources and bandwidth. Currently, how to manage images of containers in a more effective manner has become an important area of research.

SUMMARY

Therefore, it is desirable to develop and implement a technical solution of managing images of containers in a more effective manner. The technical solution is expected to be compatible with an existing application environment, and to manage images of containers in a more effective manner by modifying various configurations of the existing application environment.

According to a first aspect of the present disclosure, there is provided a method for managing an image of a container in a host device. In the method, a first image of a first container is received, wherein the first image includes a first set of image layers for implementing a first set of services of the first container respectively. The first image is loaded to deploy the first container at the host device. Based on an attribute of an image layer in the first set of image layers, an expiration time is set for the image layer. In response to determining that the expiration time is reached, the image layer is deleted from the host device.

According to a second aspect of the present disclosure, there is provided an electronic device, including: at least one processor; a volatile memory; and a memory coupled to the at least one processor and having instructions stored therein, wherein the instructions, when executed by the at least one processor, cause the electronic device to perform actions for managing an image of a container in a host device. The actions include: receiving a first image of a first container, the first image including a first set of image layers for implementing a first set of services of the first container; loading the first image to deploy the first container at the host device; based on an attribute of an image layer in the first set of image layers, setting an expiration time for the image layer; and in response to determining that the expiration time is reached, deleting the image layer from the host device.

According to a third aspect of the present disclosure, there is provided a computer program product tangibly stored on a non-transitory computer-readable medium and including machine-executable instructions that are used to implement the method according to the first aspect of the present disclosure.

BRIEF DESCRIPTION OF THE DRAWINGS

In combination with the accompanying drawings and with reference to the following detailed description, the features, advantages, and other aspects of the embodiments of the present disclosure will become more apparent, and several embodiments of the present disclosure are illustrated herein by way of example rather than limitation. In the accompanying drawings.

DETAILED DESCRIPTION

Hereinafter, illustrative embodiments of the present disclosure will be described in more detail with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example embodiment" and "one embodiment" mean "at least one example embodiment." The term "another embodiment" means "at least one further embodiment." The terms "first," "second," etc. may refer to different or the same objects. Other explicit and implicit definitions may also be included below.

Figure 1:
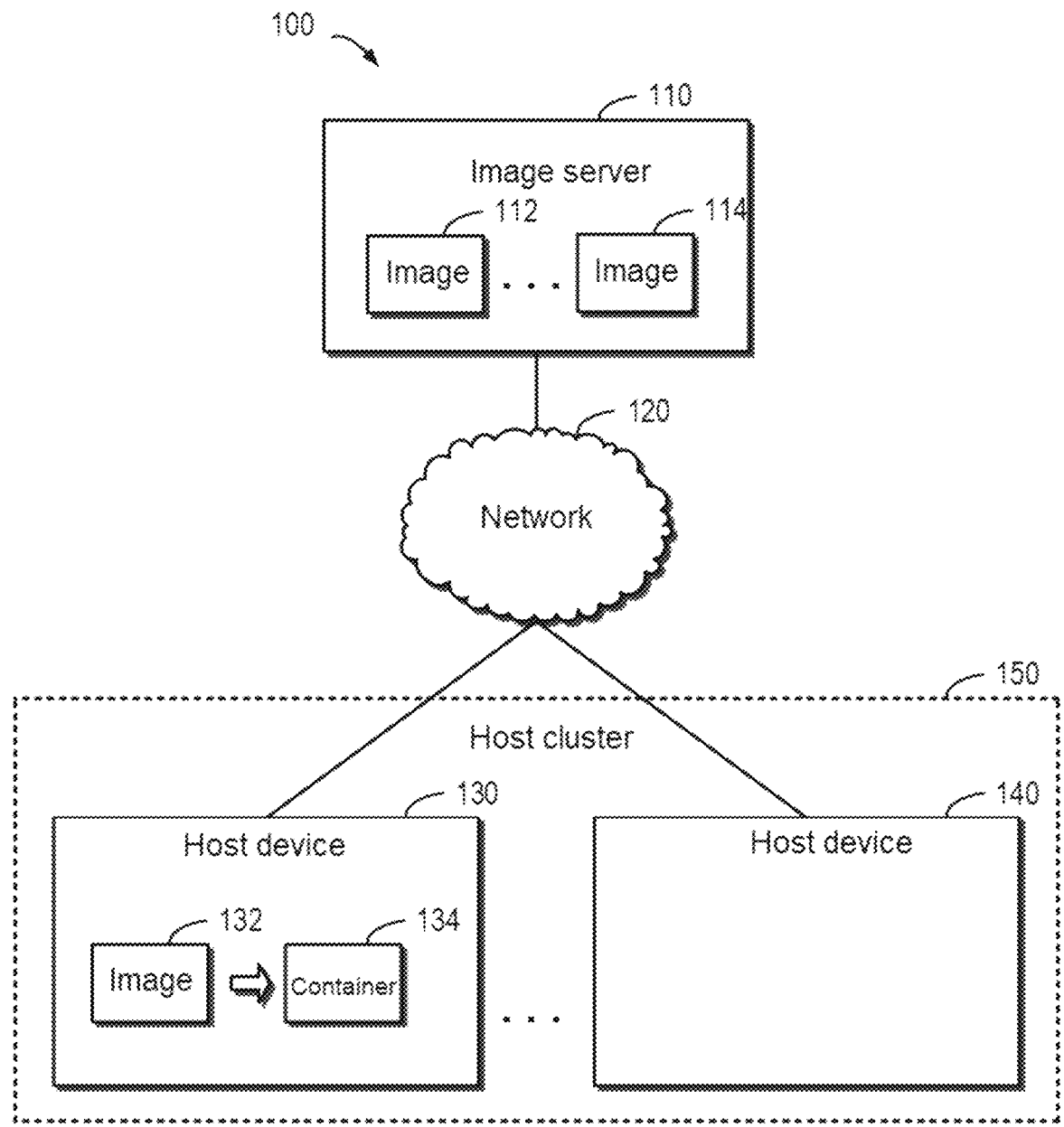
FIG. 1 schematically shows a block diagram of an application environment in which an embodiment of the present disclosure can be applied.

With the development of cloud technologies, more and more applications are developed based on a container technology. With gradual increases in types and number of containers, an image server has been established currently to manage images of containers. FIG. 1 schematically shows block diagram 100 of an application environment in which an embodiment of the present disclosure can be applied. As shown in FIG. 1, image server 110 may store images 112, . . . , and 114 of a plurality of containers. One or more host clusters 150 may be included in the application environment, and host cluster 150 may include a plurality of host devices 130, . . . , and 140. The host devices may download desired images from image server 110 via network 120. For example, host device 130 may download an image from image server 110 to form image 132 in host device 130. Image 132 may be loaded to deploy container 134 in host device 130.

It will be understood that the size of the image may vary greatly. The image of a simple container may be only tens of KB, while the image of a complex container may reach several GB. Currently, the host device has to download the image from remote image server 110 via network 120, which will result in a large communication bandwidth. In addition, network conditions may be unstable, further increasing the possibility of download failure.

It will be understood that the image may include one or more image layers. At present, a technical solution for managing the images according to the image layers and based on a distributed method has been proposed. However, the sizes of the image layers may vary greatly. When the multiple image layers included in the image are downloaded from a remote location, a large communication bandwidth still needs to be consumed. With daily increasing of types and number of containers, how to manage images of the containers in a more reliable and effective manner has become an important area of research.

Figure 2:
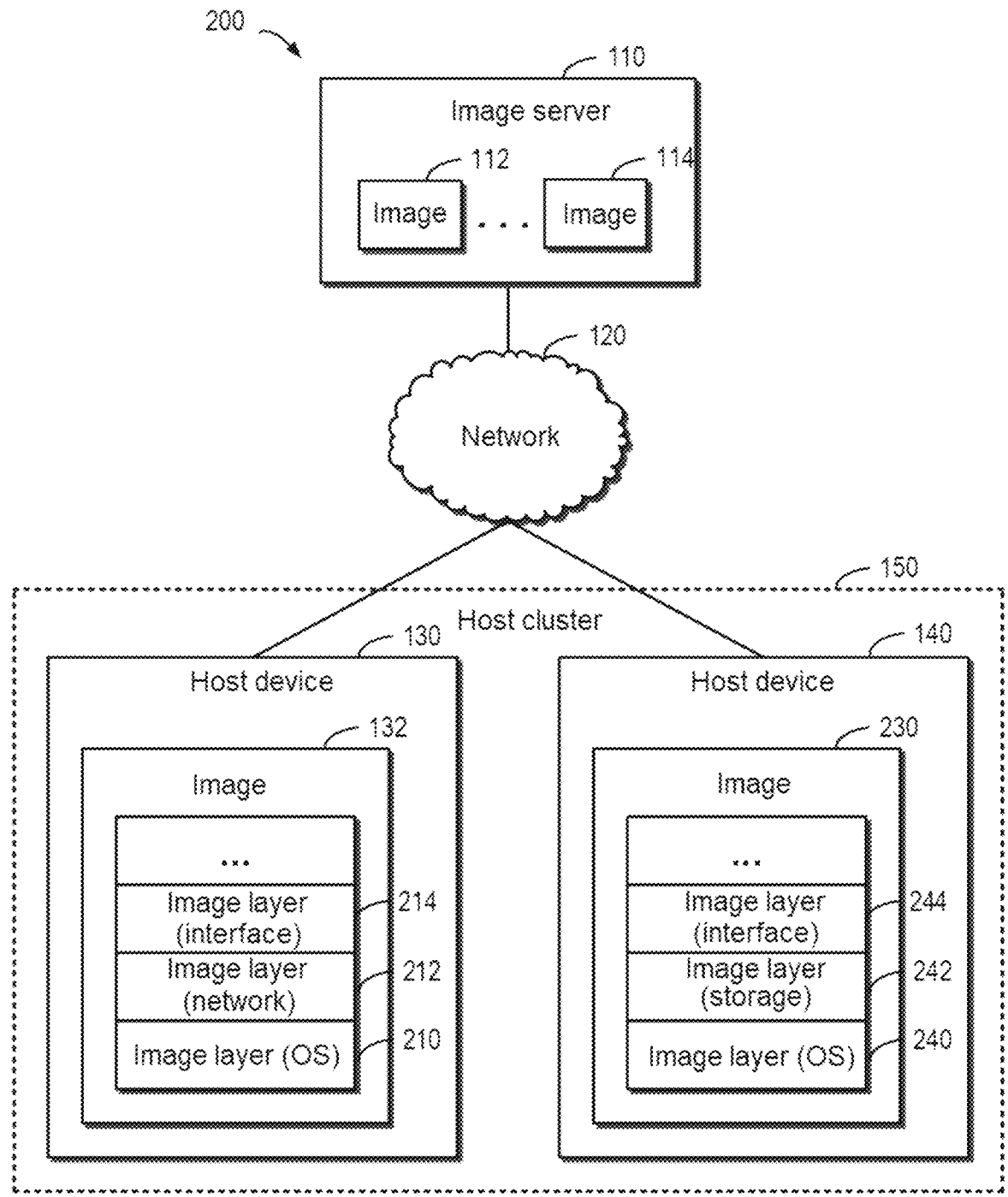
FIG. 2 schematically shows a block diagram of a process for managing an image of a container in a host device according to an embodiment of the present disclosure.

In order to at least partially solve the problems in the solution of the prior art, according to an example embodiment of the present disclosure, there are provided a method, a device, and a computer program product for managing an image of a container. Hereinafter, an overview of an example embodiment of the present disclosure will be described with reference to FIG. 2. FIG. 2 schematically shows block diagram 200 of a process for managing an image of a container in a host device according to an embodiment of the present disclosure. As shown in FIG. 2, host device 130 may download an image from image server 110 via network 120 and store the image in a storage space of host device 130 to form image 132. After image 132 is loaded and a corresponding container has been deployed, image 132 is not directly deleted, but an expiration time is set for each image layer in image 132. When the expiration time of a certain image layer is reached, the image layer is deleted.

As shown in FIG. 2, image 132 may include a plurality of image layers 210, 212, and 214. Similarly, host device 140 may download an image from image server 110 to form image 230 in host device 140. Image 230 may include a plurality of image layers 240, 242, and 244. It will be understood that each image layer stored in host device 130 may be accessed by each host device in host cluster 150 (including host device 130 and other host devices such as host device 140, etc.).

By utilizing an example embodiment of the present disclosure, host device 130 may serve as a cache for each image layer. In this way, when a host device in host cluster 150 needs to use a certain image layer because of the deployment of a new container, whether the image layer exists may be firstly determined by searching within host cluster 150. If it exists, the image layer may be directly acquired inside host cluster 150, thereby avoiding downloading the image layer from remote image server 110 via network 120. It will be understood that each host device is located inside host cluster 150, so there is a large bandwidth between all hosts. In this way, the time cost of acquiring the image layer from a remote location may be greatly reduced.

Figure 3:
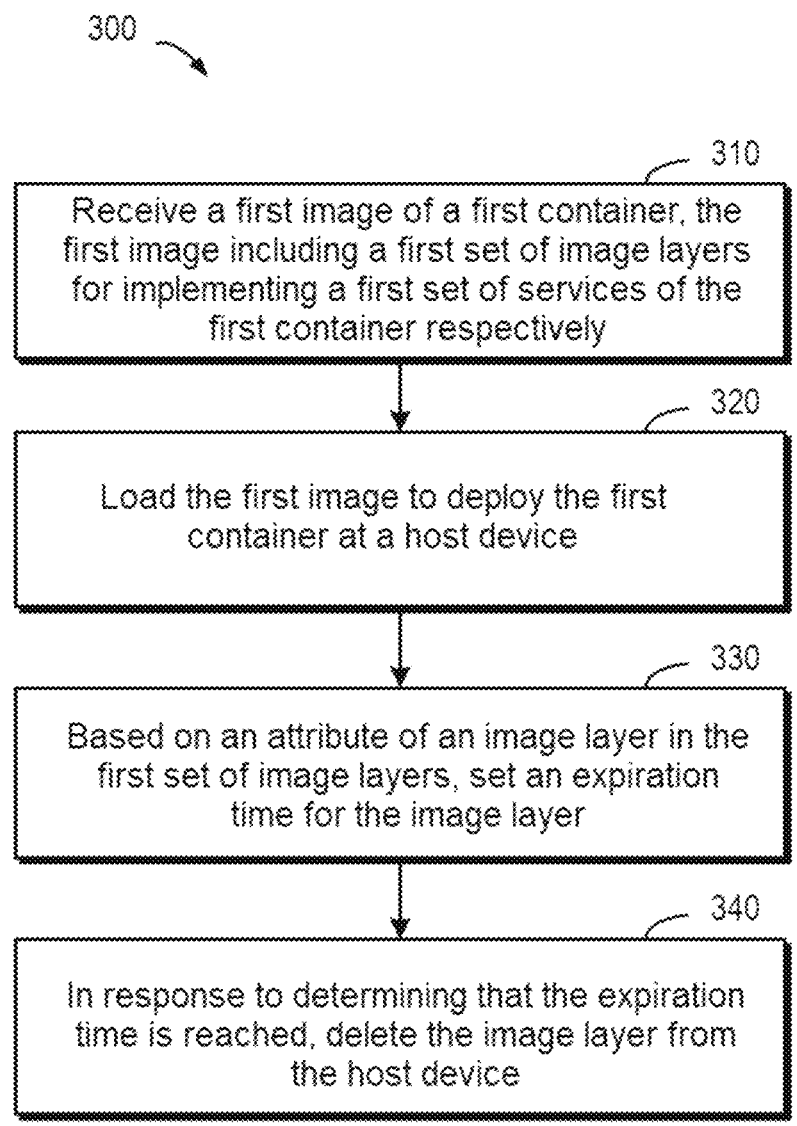
FIG. 3 schematically shows a flowchart of a method for managing an image of a container in a host device according to an embodiment of the present disclosure.

Hereinafter, more details of the method for managing the images of the containers will be described in detail with reference to FIG. 3. FIG. 3 schematically shows a flowchart of method 300 for managing the images of the containers in the host device according to an embodiment of the present disclosure. At block 310, a first image of a first container is received, wherein the first image includes a first set of image layers for implementing a first set of services of the first container respectively. Here, the first container may be, for example, an application that provides a network communication function, and the first image may include the multiple image layers as shown in FIG. 2: image layer 210, configured to provide operating system (OS) services; image layer 212, configured to provide network-related services; and image layer 214, configured to provide interface-related services, and so on.

It will be understood that the multiple image layers described above are only examples. Based on the function of the first container, the first set of image layers may include more, fewer, or different image layers. For example, for a container that provides a storage function, an image of the container may include an image layer that provides OS services, an image layer that provides storage services, and an image layer that provides interface services.

Continuing to refer to FIG. 3, at block 320, the first image is loaded to deploy the first container at host device 130. It will be understood that the loading process may be performed according to the existing technical solution. By loading the first image to host device 130, the first container for providing corresponding functions may be deployed at host device 130. It will be understood that the image is similar to an installation program, and after the image has been loaded and the first container has been successfully deployed, the image has completed its own functions.

By utilizing an example embodiment of the present disclosure, host device 130 may serve as a cache for downloading the image from remote image server 110. In other words, the first image in host device 130 can be reused to serve host devices in host cluster 150, so that other host devices can find from the first image whether there is an image layer that can be reused. According to an example embodiment of the present disclosure, after the first container has been successfully deployed, the first image is not directly deleted, but an expiration time is set for a plurality of image layers in the first image respectively. The corresponding image layer may be continuously maintained in host device 130 until the expiration time is reached. Hereinafter, more details about setting the expiration time will be described with reference to block 330 of FIG. 3.

At block 330 of FIG. 3, based on an attribute of the image layer in the first set of image layers, an expiration time is set for the image layer. It will be understood that the image layer may have various attributes, including but not limited to: a level, a size, a parallel providing number, a number of copies, a recent access time, and the like of the image layer. The expiration time may be set respectively based on the above attributes.

Figure 4:
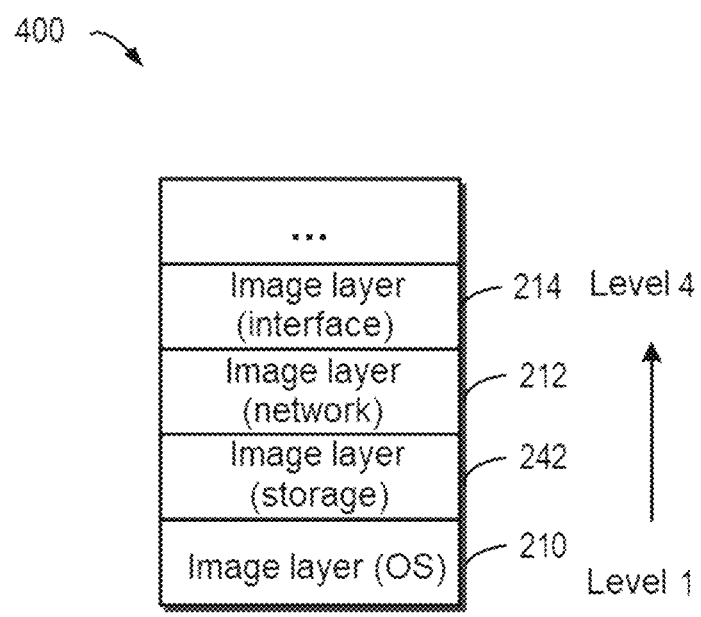
FIG. 4 schematically shows a block diagram of levels of image layers according to an embodiment of the present disclosure.

According to an example embodiment of the present disclosure, the expiration time may be set based on the level of the image layer. Specifically, the expiration time may be set to be inversely proportional to the level. The concept of levels of the image layer is described with reference to FIG. 4. FIG. 4 schematically shows block diagram 400 of levels of the image layers according to an embodiment of the present disclosure. It will be understood that the image is not an integrated structure, but may include image layers at a plurality of levels. Generally speaking, the lower the level of an image layer, the more basic service the image layer provides; and the higher the level of an image layer, the more dedicated service the image layer provides. As shown in FIG. 4, the level of image layer 210 for providing the OS services may be set as 1, the level of image layer 242 for providing the storage services may be set as 2, the level of image layer 212 for providing the network services may be set as 3, the level of image layer 214 for providing the interface services may be set as 4, and so on.

It will be understood that FIG. 4 only schematically shows the level setting of several image layers that may be included in the image. According to an example embodiment of the present disclosure, the image may include more, fewer, or different image layers, and each image layer may have a different level. Generally speaking, image layers with lower levels are used more frequently. For example, image layer 210 that provides the OS services is the basis of the containers, and almost every container uses image layer 210. Thus, a longer expiration time may be set for image layer 210. For another example, each container may have a different interface, and image layer 214 that provides a certain interface service is less likely to be used by other containers. Thus, a shorter expiration time may be set for image layer 214.

According to an example embodiment of the present disclosure, in which the level of an image layer may be represented by symbol l, the expiration time of the image layer may be determined based on the following formula for time:

$$\text{time} = f\left(\frac{1}{l}\right) \qquad \text{Equation 1}$$

where time indicates the expiration time of the image layer, l indicates the level of the image layer, and f indicates a predetermined function. It will be understood that the above Equation 1 is only an example, and those skilled in the art can set a specific formula of the function f according to the requirements of a specific application environment, as long as the formula is inversely proportional to the variable l.

By utilizing an example embodiment of the present disclosure, a longer expiration time is set for a more general image layer, and a shorter expiration time is set for a more dedicated image layer. In this way, a limited storage space in the host device may be used to store the image layers that may be used by more containers as much as possible, thereby reducing the situation of acquiring the image layers from outside host cluster 150.

According to an example embodiment of the present disclosure, the expiration time may be set based on the size of the image layer. Specifically, the expiration time may be set to be directly proportional to the size. It will be understood that if the size of the image layer is larger, downloading the image layer from remote image server 110 will consume more bandwidth and time. According to an example embodiment of the present disclosure, the image layer with the larger size may be stored preferentially. In this embodiment, in which the size of the image layer may be represented by symbol s, the expiration time of the image layer may be determined based on the following formula for time:

$$\text{time} = f(\log(s)) \qquad \text{Equation 2}$$

where time indicates the expiration time of the image layer, s indicates the size of the image layer, and f indicates a predetermined function. It will be understood that due to the large size range of the image layer, the function log (s) is used here to reduce the impact of the variable s on the expiration time. It will be understood that the above Equation 2 is only an example, and those skilled in the art can set a specific formula of the function f according to the requirements of a specific application environment, as long as the formula is directly proportional to the variable s.

According to an example embodiment of the present disclosure, the above Equations 1 and 2 may be combined, and the expiration time of the image layer time is determined based on the following Equation 3, where the meaning of each variable is the same as in Equations 1 and 2.

$$\text{time} = f\left(\frac{\log(s)}{l}\right) \qquad \text{Equation 3}$$

By utilizing an example embodiment of the present disclosure, a longer expiration time is set for the larger image layer, and a shorter expiration time is set for the smaller image layer. For the smaller image layer, even if the image layer does not exist in host cluster 150, downloading the image layer from remote image server 110 does not occupy too much bandwidth and download time. In this way, the limited storage space in the host device may be utilized to store a larger image layer as much as possible, so as to reduce the bandwidth and time costs caused by downloading from remote image server 110.

According to an example embodiment of the present disclosure, the expiration time may be set based on a parallel providing number of the image layer, and the expiration time here may be directly proportional to the parallel providing number. It will be understood that the parallel providing number indicates how many other host devices in the host cluster access the image layer in parallel at most. Based on a topological structure of host cluster 150, the host device may be connected to one or more other host devices. For example, host device 130 may be connected to three other host devices in parallel. In such an arrangement, the parallel providing number of the image layer in host device 130 is three. The parallel providing number of the image layer may be represented by symbol p. The expiration time of the image layer may be determined based on the following formula for time:

$$\text{time} = f(p) \qquad \text{Equation 4}$$

where time indicates the expiration time of the image layer, p indicates the parallel providing number of the image layer, and $f$ indicates a predetermined function. It will be understood that the above Equation 4 is only an example, and those skilled in the art can set a specific formula of the function $f$ according to the requirements of a specific application environment, as long as the formula is directly proportional to the variable p.

According to an example embodiment of the present disclosure, the above Equations 1 to 4 may be combined, and the expiration time of the image layer time is determined based on the following Equation 5, where the meaning of each variable is the same as in Equations 1 to 4.

$$\text{time} = f\left(\frac{\log(s) * p}{l}\right) \quad \text{Equation 5}$$

By utilizing an example embodiment of the present disclosure, if the parallel providing number of a certain image layer is larger, it means that the image layer can be accessed in parallel by more host devices. By setting a longer expiration time for an image layer with a larger parallel providing number, it is possible to preferentially store in the host device image layers that can be accessed by more other host devices at the same time. In this way, the bandwidth and time costs required for downloading the image layers from remote image server 110 outside host cluster 150 may be reduced.

According to an example embodiment of the present disclosure, the expiration time may be set based on a number of copies of the image layer included in the host cluster. Specifically, the expiration time may be set to be inversely proportional to the number of the copies. It will be understood that the number of the copies represents the total number of the copies of the image layer included in host cluster 150. If the number of the copies is large, deleting a certain image layer will not have a large impact on the number of the copies; and if the number of the copies is small, deleting a certain image layer will significantly reduce the number of the copies. Therefore, a shorter expiration time may be set for an image layer with a large number of copies, and a longer expiration time may be set for an image layer with a small number of copies. The number of the copies of the image layer may be represented by symbol n. The expiration time of the image layer may be determined based on the following formula for time:

$$\text{time} = f(e^{-n}) \quad \text{Equation 6}$$

where time indicates the expiration time of the image layer, n indicates the number of the copies of the image layer, and $f$ indicates a predetermined function. It will be understood that due to the large range of the number of the copies of the image layer, the function $e^{-n}$ is used here to reduce the impact of the variable n on the expiration time. It will be understood that the above Equation 6 is only an example, and those skilled in the art can set a specific formula of the function $f$ according to the requirements of a specific application environment, as long as the formula is inversely proportional to the variable n.

According to an example embodiment of the present disclosure, the above Equations 1 to 6 may be combined, and the expiration time of the image layer time is determined based on the following Equation 7, where the meaning of each variable is the same as in Equations 1 to 6.

$$\text{time} = f\left(\frac{\log(s) * p * e^{-n}}{l}\right) \quad \text{Equation 7}$$

By utilizing an example embodiment of the present disclosure, by setting a longer expiration time for the image layer with the small number of the copies, it is possible to preferentially store the image layer with only a few copies in the host device. In this way, the limited storage space in the host cluster may be used to store more different image layers, thereby reducing the situation of downloading the image layers from remote image server 110 outside host cluster 150.

According to an example embodiment of the present disclosure, the expiration time may be set based on a difference between a current time and a time when an image layer was recently accessed. Specifically, the expiration time may be set to be inversely proportional to the difference. Here, the expiration time may be set based on the least recently used principle. A large difference means that the image layer has not been accessed for a long period of time, so it can be deleted. A small difference means that the image layer has just been accessed recently, so it needs to be retained. The difference of times may be represented by symbol $\Delta t$. The expiration time of the image layer may be determined based on the following formula for time:

$$\text{time} = f\left(\frac{1}{\Delta t}\right) \quad \text{Equation 8}$$

where time indicates the expiration time of an image layer, $\Delta t$ indicates the difference of times of the image layer, and $f$ indicates a predetermined function. It will be understood that the above Equation 8 is only an example, and those skilled in the art can set a specific formula of the function $f$ according to the requirements of a specific application environment, as long as the formula is inversely proportional to the variable $\Delta t$.

By utilizing an example embodiment of the present disclosure, by setting the longer expiration time for the image layer that is frequently accessed recently, it is possible to preferentially store the image layer with the high popularity in the host device. In this way, the limited storage space in the host cluster may be used to store the image layers that are easier to access, thereby reducing the situation of downloading the image layers from remote image server 110 outside host cluster 150.

According to an example embodiment of the present disclosure, the image layers may be accessed by a local host device that stores the image layers, or by host devices other than the local host device. Therefore, the time when the image layer was recently accessed includes at least one of the following: the time when the host device recently accessed the image layer, and the time when the other host devices in the host cluster recently accessed the image layer. The time when the image layer was recently accessed may be determined based on any one of the above two timings. For example, either time may be selected from the two times, and an earlier time or a later time may be selected.

According to an example embodiment of the present disclosure, if the image layer in the host device is accessed, the expiration time of the image layer may be updated. By utilizing an example embodiment of the present disclosure, the expiration time of an image layer may be dynamically adjusted continuously to store the image layer with the high popularity in the host device.

By utilizing an example embodiment of the present disclosure, two cases of local access by the local host device and remote access by the other host devices in host cluster 150 may be considered. Both the access time of local access and the access time of remote access may indicate the popularity of the image layer. In this way, the limited storage space in the host cluster may be used to store the image layer with high popularity, thereby reducing the situation of downloading image layers from remote image server 110 outside host cluster 150.

According to an example embodiment of the present disclosure, the above Equations 1 to 8 may be combined, and the expiration time of the image layer time is determined based on the following Equation 9, where the meaning of each variable is the same as in Equations 1 to 8.

$$\text{time} = f\left(\frac{\log(s) * p * e^{-n}}{l * \Delta t}\right) \quad \text{Equation 9}$$

In the above, how to determine the expiration time of the image layer has been described with reference to the Equations 1 to 9. It will be understood that the above Equations 1 to 9 only schematically show examples of the relationship between the expiration time and various attributes of the image layer. According to other example embodiments of the present disclosure, other formulas may be set based on specific application environments.

Hereinafter, more details about managing the image layer based on the expiration time will be described with reference to FIG. 3 again. At block 340, if it is determined that the expiration time is reached, the image layer is deleted from the host device. According to an example embodiment of the present disclosure, reaching the expiration time indicates that the possibility that the image layer will be accessed in the future is greatly lowered, so the image layer may be deleted from the host device. By utilizing an example embodiment of the present disclosure, as each host device in host cluster 150 runs, the expiration time of each image layer may be continuously updated, and an image layer that has expired may be deleted. In this way, it can be ensured that the stored images do not occupy too much storage space of the host device, thereby ensuring the overall performance of the host device.

According to an example embodiment of the present disclosure, one or more image layers stored in the host device may be reused. Specifically, if an instruction to deploy a second container at the host device is received, a second set of image layers for implementing a second set of services of the second container may be determined. Then, whether an image layer in the second set of image layers is included in the host device may be determined. If the host device includes a certain image layer in the second image layer, the specified image layer may be directly reused. Hereinafter, more details will be described with reference to FIG. 5.

Figure 5:
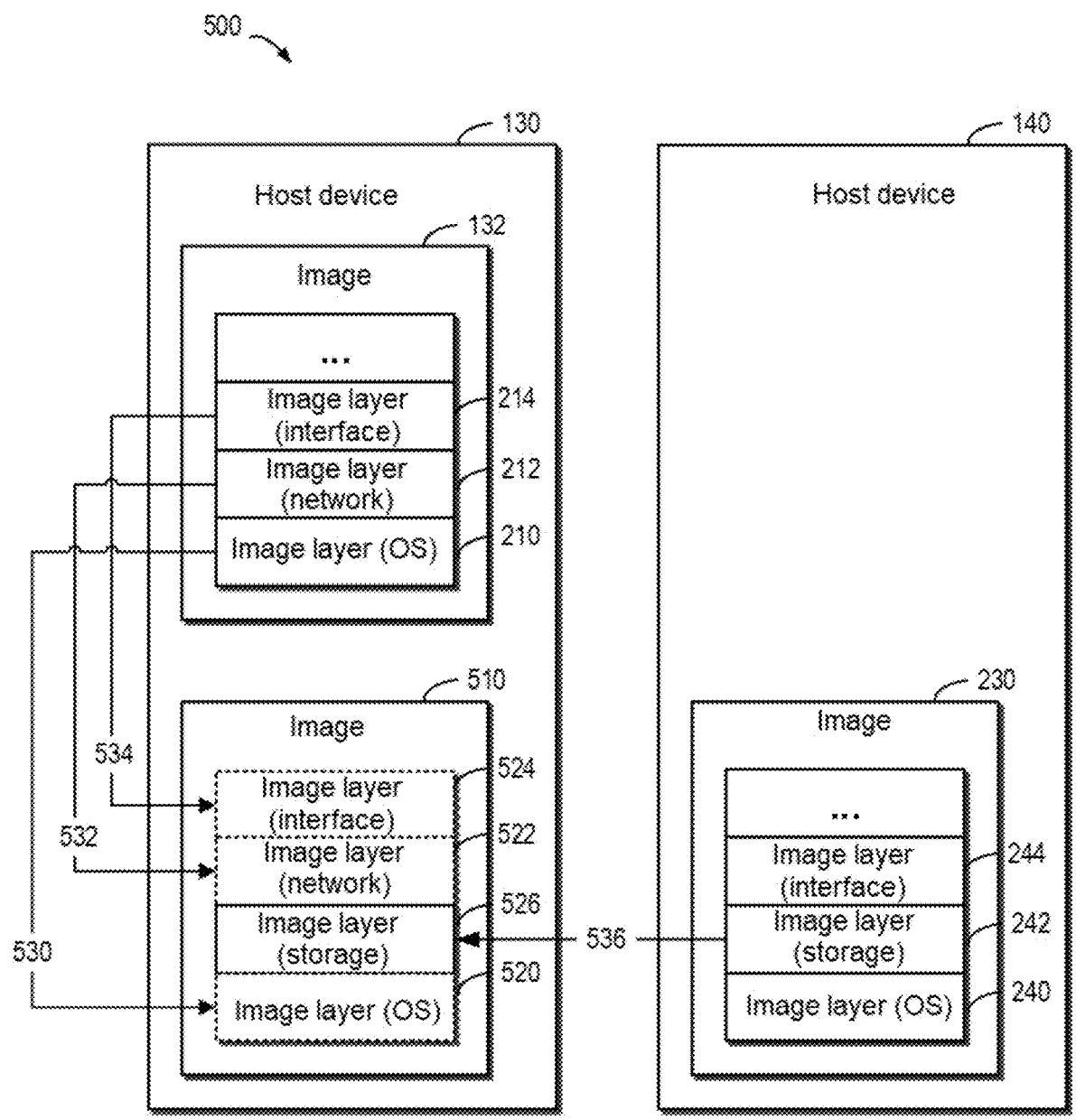
FIG. 5 schematically shows a block diagram of a process for acquiring an image of a new container according to an embodiment of the present disclosure.

FIG. 5 schematically shows block diagram 500 of a process for acquiring an image of a new container according to an embodiment of the present disclosure. In FIG. 5, it is assumed that image 510 of the new container should include four image layers: an image layer for interface services, an image layer for network services, an image layer for storage services, and an image layer for an OS. At a given point in time, whether the above-mentioned image layer exists in host device 130 may be firstly checked. Assuming that all the image layers stored in host device 130 are not expired at that point in time, host device 130 includes image layer 214 for the interface services, image layer 212 for the network services, and image layer 210 for the OS.

Accordingly, the above-mentioned image layers may be reused. As shown by arrow 534, image layer 524 in image 510 may be formed using locally stored image layer 214; as shown by arrow 532, image layer 522 in image 510 may be formed using locally stored image layer 212; and as shown by arrow 530, image layer 520 in image 510 may be formed using locally stored image layer 210.

According to an example embodiment of the present disclosure, host device 130 does not include the image layer for storage required for deploying the new container, and the image layer may be acquired from other host devices in host cluster 150 (for example, host device 140) at that time. As shown by arrow 536, image layer 526 in image 510 may be formed using image layer 242 stored in host device 140. Once all the image layers for deploying the new container have been included in host device 130, image 510 may be started to deploy the new container in host device 130.

According to an example embodiment of the present disclosure, a unified distributed storage system for the image layers may be established by utilizing all the image layers stored in all the host devices located in host cluster 150 respectively. Through the network connection inside host cluster 150, each host device may share the image layers in the distributed storage system, thereby reducing the need to download the image layers from an image server outside of host cluster 150.

By utilizing an example embodiment of the present disclosure, the image layers in the local host device may be reused, and the image layers in the other host devices in host cluster 150 may also be reused. It will be understood that all the host devices in host cluster 150 are close to each other, so regardless of accessing the image layers in the local host device or accessing the image layers in the other host devices, the desired image layer may be quickly obtained. In this way, the situation of downloading the image layers from remote image server 110 via the network may be avoided as much as possible.

According to an example embodiment of the present disclosure, in order to obtain the specified image layer from the other host devices, a topological structure representing the connection between the host device and the other host devices in the host cluster may be first obtained. In the context of the present disclosure, the topological structure may be expressed in a variety of ways. For example, the topological structure may be expressed via a distributed hash table (DHT). The distributed hash table may be set for each host device, and a universally unique identifier (UUID) of another host device connected to the host device may be recorded in the distributed hash table, and a path between the host device and the other host device (for example, indicated by "jump") may also be recorded.

Figure 6:
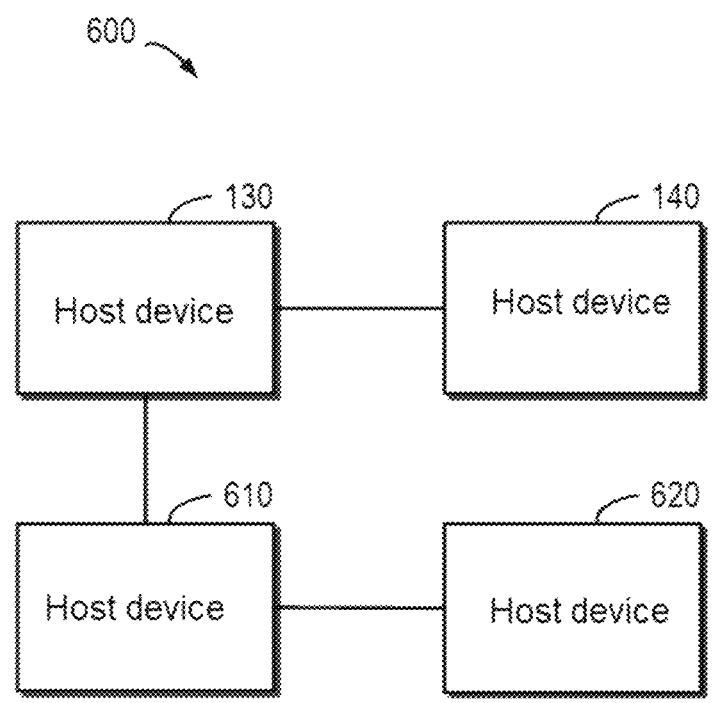
FIG. 6 schematically shows a block diagram of a topological structure between all hosts in a host cluster according to an embodiment of the present disclosure.

Hereinafter, more details will be described with reference to FIG. 6. FIG. 6 schematically shows block diagram 600 of the topological structure between the hosts in the host cluster according to an embodiment of the present disclosure. As shown in FIG. 6, host device 130 is connected to host devices 140 and 610, and host device 610 is connected to host device 620. Accordingly, the distributed hash table of host device 130 may include the following entries: the first entry includes the UUID of host device 140 and the path (1 jump) from host device 130 to host device 140; the second entry includes the UUID of host device 610 and the path (1 jump) from host device 130 to host device 610; and the third entry includes the UUID of host device 620 and the path (2 jumps) from host device 130 to host device 620.

According to an example embodiment of the present disclosure, host device 130 may obtain a specified image layer from other host devices via the distributed hash table. Host device 130 may choose to search a host device with a relatively short logical distance. If the searched host device has the specified image layer, the image layer searched for may be returned to host device 130. If the searched host device does not have the specified image layer, a search request may be forwarded to the other host devices. For example, if host device 610 does not have the specified image layer, a search request from host device 130 may be forwarded to host device 620. If host device 620 has the specified image layer, the image layer searched for may be returned to host device 130 via host device 610.

By utilizing an example embodiment of the present disclosure, the host device may directly utilize the existing distributed hash table to check whether the host device connected to itself has the desired image layer. In this way, the desired image layer may be preferentially obtained inside host cluster 150, thereby lowering the bandwidth requirement for communication with the outside of host cluster 150.

Figure 7A:
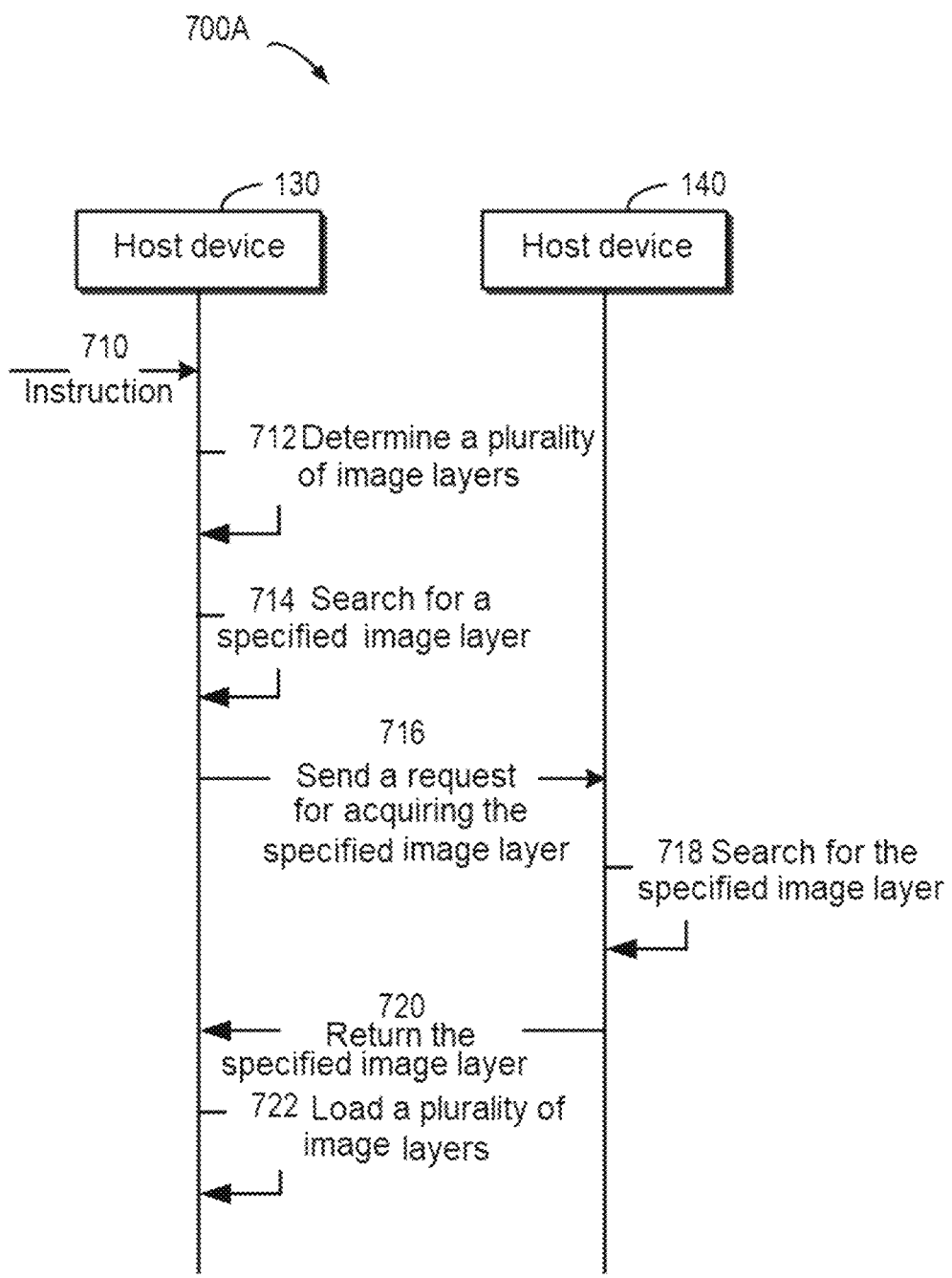
FIG. 7A schematically shows a block diagram of a process for deploying a new container according to an embodiment of the present disclosure.

FIG. 7A schematically shows block diagram 700A of a process for deploying a new container according to an embodiment of the present disclosure. As shown in FIG. 7A, host device 130 may receive 710 an instruction for deploying the new container, and may determine 712 a plurality of image layers corresponding to the new container. Then, host device 130 may locally search 714 for each of the plurality of image layers one by one. If the specified image layer is found locally, the specified image layer may be reused. If the specified image layer is not found locally, a request to acquire the specified image layer may be sent 716 to other host devices (e.g., host device 140). After receiving the request, host device 140 may search 718 locally to see whether there is a specified image layer. If a determining result is "Yes," the specified image layer may be returned 720 to host device 130. After all the multiple image layers have been acquired, host device 130 may load 722 the multiple image layers to deploy the new container.

It will be understood that FIG. 7A schematically shows an example of searching 714 for the specified image layer locally on host device 130 and acquiring the specified image layer from host device 140. The above steps can be performed for each specified image layer to acquire each image layer of the plurality of image layers.

Figure 7B:
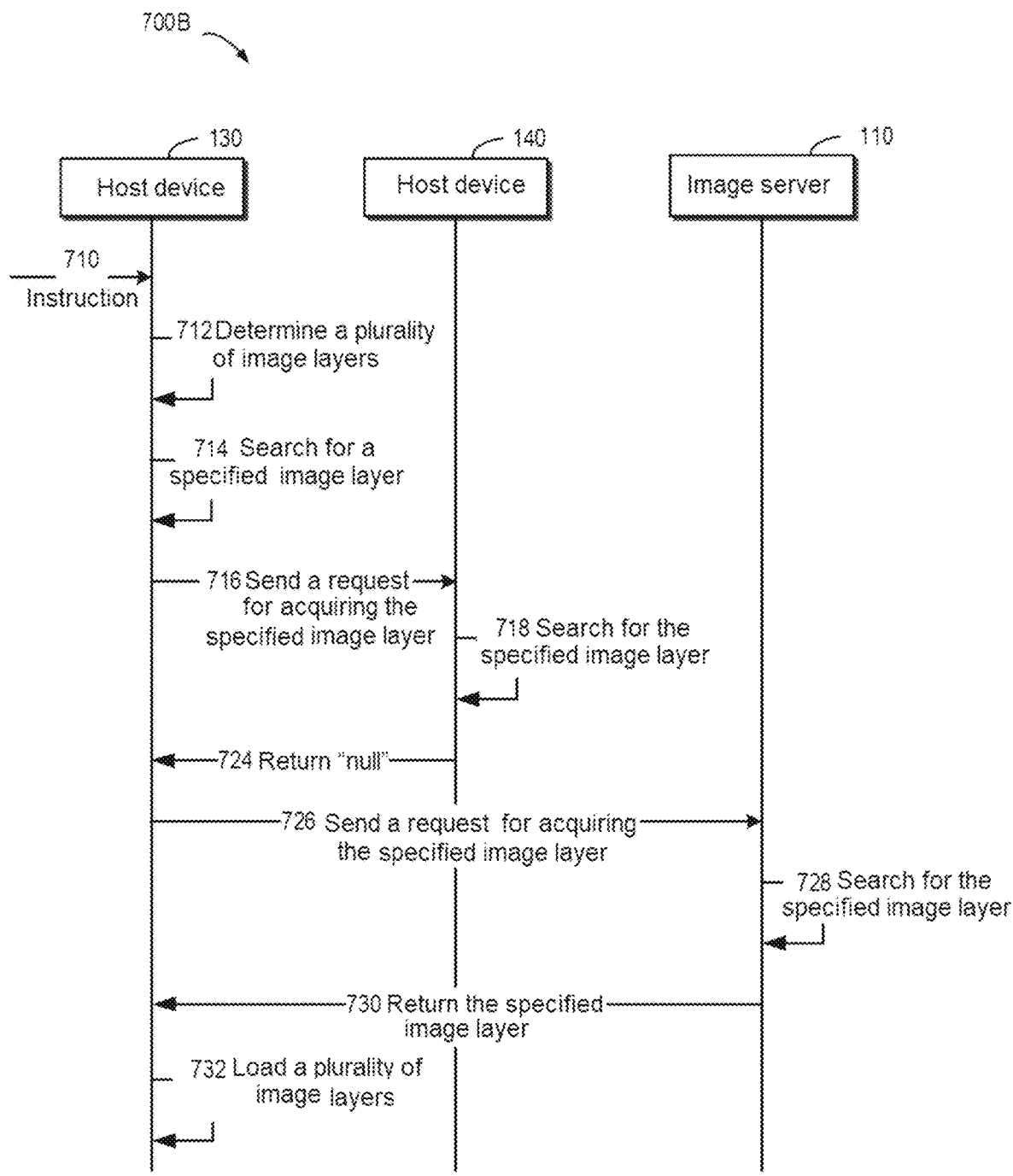
FIG. 7B schematically shows a block diagram of a process for deploying a new container according to an embodiment of the present disclosure.

According to an example embodiment of the present disclosure, if the specified image layer is not included in host cluster 150, the specified image layer may be acquired from image server 110. Hereinafter, more details will be described with reference to FIG. 7B. FIG. 7B schematically shows block diagram 700B of a process for deploying the new container according to an embodiment of the present disclosure. In FIG. 7B, steps 710 to 718 are the same as those shown in FIG. 7A, and thus will not be described again.

If host device 140 does not have the specified image layer, host device 140 forwards a request (not shown) from host device 130 to other host devices. If the specified image layer is not included in host cluster 150, host device 140 may return 724 "null" to host device 130. Host device 130 may then send 726 a request to acquire the specified image layer to image server 110. Image server 110 will search 728 for the specified image layer and return 730 the specified image layer to host device 130. After all the multiple image layers have been acquired, host device 130 may load 732 the multiple image layers to deploy the new container.

By utilizing an example embodiment of the present disclosure, host device 130 may preferentially search for the image layers for deploying the new container in the host devices in host cluster 150. If a certain specified image layer is not included in host cluster 150, the specified image layer may be downloaded from remote image server 110. Compared with an existing technical solution of directly downloading all image layers from remote image server 110, an example embodiment of the present disclosure can make full use of the image layers stored inside host cluster 150, and only when a certain image layer does not exist in host cluster 150, is remote image server 110 accessed. In this way, the bandwidth requirement for accessing remote image server 110 may be lowered, and the time cost for acquiring the image layers may be lowered.

It will be understood that the processes in the above FIG. 7A and FIG. 7B are only examples. According to an example embodiment of the present disclosure, different processes may be adopted based on specific application environments. For example, when a host device with a certain image layer is found to be under a higher workload (or for other reasons), the image layer may be downloaded directly from image server 110.

Examples of the method according to the present disclosure have been described in detail above with reference to FIG. 2 to FIG. 7B, and the embodiment of a corresponding device will be described below. According to an example embodiment of the present disclosure, there is provided an apparatus for managing an image of a container in a host device. The apparatus includes: a receiving module, configured to receive a first image of a first container, wherein the first image includes a first set of image layers for implementing a first set of services of the first container; a loading module, configured to load the first image to deploy the first container at the host device; a setting module, configured to set an expiration time for an image layer based on an attribute of the image layer in the first set of image layers; and a deleting module, configured to delete the image layer from the host device in response to determining that the expiration time is reached. According to an example embodiment of the present disclosure, the apparatus may further include modules for performing other steps in the method described above.

Figure 8:
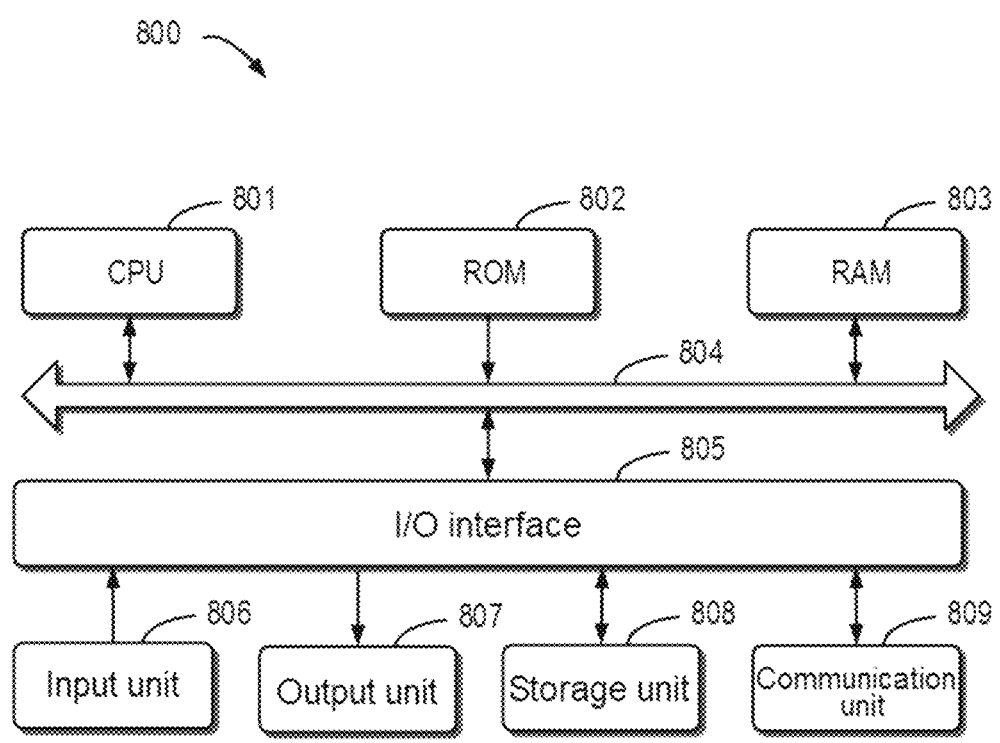
FIG. 8 schematically shows a block diagram of a device for managing an image of a container in a host device according to an example embodiment of the present disclosure.

FIG. 8 schematically shows a block diagram of device 800 for managing an image of a container in a host device according to an example embodiment of the present disclosure. As shown in the figure, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices over a computer network such as the Internet and/or various telecommunication networks.

The various processes and processing procedures described above, such as method 300, may be performed by CPU 801. For example, in some embodiments, method 300 may be implemented as a computer software program that is tangibly included in a machine-readable medium, such as storage unit 808. In some embodiments, part or all of the computer programs may be loaded and/or installed on device 800 via ROM 802 and/or communication unit 809. When the computer program is loaded into RAM 803 and executed by CPU 801, one or more steps of method 300 described above may be performed. Alternatively, in other embodiments, CPU 801 may also be configured in any other suitable manner to implement the above-described process/method.

According to an example embodiment of the present disclosure, there is provided an electronic device, including: at least one processor; a volatile memory, and a memory coupled to the at least one processor and having instructions stored thereon, wherein the instructions, when executed by the at least one processor, cause the electronic device to perform actions of managing images of containers in a host device. The actions include: receiving a first image of a first container, the first image including a first set of image layers for implementing a first set of services of the first container; loading the first image to deploy the first container at the host device; based on an attribute of an image layer in the first set of image layers, setting an expiration time for the image layer; and in response to determining that the expiration time is reached, deleting the image layer from the host device.

According to an example embodiment of the present disclosure, setting an expiration time for the image layers includes: setting the expiration time based on a level of the image layer, wherein the expiration time is inversely proportional to the level.

According to an example embodiment of the present disclosure, setting an expiration time for the image layer includes: setting the expiration time based on a size of the image layer, wherein the expiration time is directly proportional to the size.

According to an example embodiment of the present disclosure, setting an expiration time for the image layers includes: setting the expiration time based on a parallel providing number of the image layers, wherein the expiration time is directly proportional to the parallel providing number, and the parallel providing number represents how many other host devices in a host cluster access the image layers in parallel at most.

According to an example embodiment of the present disclosure, setting an expiration time for the image layer includes: setting the expiration time based on a number of copies of the image layer included in the host cluster, wherein the expiration time is inversely proportional to the number of the copies.

According to an example embodiment of the present disclosure, setting an expiration time for the image layer includes: setting the expiration time based on a difference between a current time and a time when the image layer was recently accessed, wherein the expiration time is inversely proportional to the difference, and the time when the image layer was recently accessed includes at least one of the following: the time when the host device recently accessed the image layer, and the time when the other host devices in the host cluster recently accessed the image layer.

According to an example embodiment of the present disclosure, the actions further include: in response to receiving an instruction to deploy a second container at the host device, determining a second set of image layers for implementing a second set of services of the second container; and in response to determining that a specified image layer in the second set of image layers is not included in the host device, acquiring the specified image layer from other host devices in a host cluster.

According to an example embodiment of the present disclosure, acquiring the specified image layer from the other host devices includes: acquiring a topological structure representing the connection between the host device and the other host devices in the host cluster; and based on the topological structure, acquiring the specified image layer from the other host devices.

According to an example embodiment of the present disclosure, the actions further include: in response to determining that the specified image layer is not included in the host cluster, acquiring the specified image layer from an image server connected to the host cluster.

According to an example embodiment of the present disclosure, the actions further include: in response to receiving a request from the other host devices in the host cluster for acquiring the image layer, providing the image layer to the other host devices; and updating the expiration time of the image layer.

According to an example embodiment of the present disclosure, there is provided a computer program product tangibly stored on a non-transitory computer-readable medium and including machine-executable instructions that are used to implement the method according to the present disclosure.

According to an example embodiment of the present disclosure, there is provided a computer-readable medium. The computer-readable medium stores machine-executable instructions that, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some embodiments, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or block diagrams and combinations of blocks in the flowcharts and/or block diagrams can be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible embodiments of systems, methods, and computer program products according to multiple embodiments of the present disclosure. In this regard, each block in the flowcharts or block diagrams may represent a module, a program segment, or a part of an instruction that contains one or more executable instructions for implementing specified logical functions. In some alternative embodiments, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The above description is illustrative but not exhaustive, and is not limited to the various embodiments disclosed. Multiple modifications and variations will be apparent to those of ordinary skill in the art without departing from the scope and spirit of the illustrated various embodiments. The selection of terms as used herein is intended to best explain the principles and practical applications of the various embodiments or the improvements to technologies on the market, and to otherwise enable persons of ordinary skill in the art to understand the embodiments disclosed herein.

What is claimed is:

1. A method for managing an image of a container in a host device, comprising:
    receiving a first image of a first container, the first image comprising a first set of image layers for implementing a first set of services of the first container respectively;
    loading the first image to deploy the first container at the host device;
    based on an attribute of an image layer in the first set of image layers, setting an expiration time for the image layer; and
    in response to determining that the expiration time is reached, deleting the image layer from the host device;
    wherein the attribute of the image layer comprises at least one of a parallel providing number of the image layer and a number of copies of the image layer in a host cluster; and
    wherein the expiration time is determined at least in part as a function of the attribute of the image layer.

2. The method according to claim 1, wherein setting an expiration time for the image layer comprises: setting the expiration time based on a level of the image layer, wherein the expiration time is inversely proportional to the level.

3. The method according to claim 1, wherein setting an expiration time for the image layer comprises: setting the expiration time based on the parallel providing number of the image layer, wherein the expiration time is directly proportional to the parallel providing number, and the parallel providing number represents how many other host devices in the host cluster access the image layer in parallel at most.

4. The method according to claim 1, wherein setting an expiration time for the image layer comprises: setting the expiration time based on the number of copies of the image layer in the host cluster, wherein the expiration time is inversely proportional to the number of the copies.

5. The method according to claim 1, wherein setting an expiration time for the image layer comprises: setting the expiration time based on a difference between a current time and a time when the image layer was recently accessed, wherein the expiration time is inversely proportional to the difference, and the time when the image layer was recently accessed comprises at least one of the following:
   a time when the host device recently accessed the image layer; and
   a time when one or more other host devices in the host cluster recently accessed the image layer.

6. The method according to claim 1, further comprising:
in response to receiving an instruction to deploy a second container at the host device,
   determining a second set of image layers for implementing a second set of services of the second container; and
   in response to determining that a specified image layer in the second set of image layers is not in the host device, acquiring the specified image layer from one or more other host devices in the host cluster.

7. The method according to claim 6, wherein acquiring the specified image layer from the one or more other host devices comprises:
   acquiring a topological structure representing a connection between the host device and a plurality of other host devices in the host cluster; and
   based on the topological structure, acquiring the specified image layer from the other host devices.

8. The method according to claim 6, further comprising:
in response to determining that the specified image layer is not in the host cluster, acquiring the specified image layer from an image server connected to the host cluster.

9. The method according to claim 1, further comprising:
   in response to receiving a request from one or more other host devices in the host cluster for acquiring the image layer, providing the image layer to the one or more other host devices; and
   updating the expiration time of the image layer.

10. A method for managing an image of a container in a host device, comprising:
   receiving a first image of a first container, the first image comprising a first set of image layers for implementing a first set of services of the first container respectively;
   loading the first image to deploy the first container at the host device;
   based on an attribute of an image layer in the first set of image layers, setting an expiration time for the image layer; and
   in response to determining that the expiration time is reached, deleting the image layer from the host device;
   wherein setting an expiration time for the image layer comprises: setting the expiration time based on a size of the image layer, wherein the expiration time is directly proportional to the size.

11. An electronic device, comprising:
   at least one processor; and
   a memory coupled to the at least one processor and having instructions stored therein, wherein the instructions, when executed by the at least one processor, cause the electronic device to perform actions for managing an image of a container in a host device, and the actions include:
   receiving a first image of a first container, the first image comprising a first set of image layers for implementing a first set of services of the first container respectively;
   loading the first image to deploy the first container at the host device;
   based on an attribute of an image layer in the first set of image layers, setting an expiration time for the image layer; and
   in response to determining that the expiration time is reached, deleting the image layer from the host device;
   wherein the attribute of the image layer comprises at least one of a parallel providing number of the image layer and a number of copies of the image layer in a host cluster; and
   wherein the expiration time is determined at least in part as a function of the attribute of the image layer.

12. The device according to claim 11, wherein setting an expiration time for the image layer comprises: setting the expiration time based on a level of the image layer, wherein the expiration time is inversely proportional to the level.

13. The device according to claim 11, wherein setting an expiration time for the image layer comprises: setting the expiration time based on the parallel providing number of the image layer, wherein the expiration time is directly proportional to the parallel providing number, and the parallel providing number represents how many other host devices in the host cluster access the image layer in parallel at most.

14. The device according to claim 11, wherein setting an expiration time for the image layer comprises: setting the expiration time based on the number of copies of the image layer in the host cluster, wherein the expiration time is inversely proportional to the number of the copies.

15. The device according to claim 11, wherein setting an expiration time for the image layer comprises: setting the expiration time based on a difference between a current time and a time when the image layer was recently accessed, wherein the expiration time is inversely proportional to the difference, and the time when the image layer was recently accessed comprises at least one of the following:
   a time when the host device recently accessed the image layer; and
   a time when one or more other host devices in the host cluster recently accessed the image layer.

16. The device according to claim 11, wherein the actions further comprise: in response to receiving an instruction to deploy a second container at the host device,
   determining a second set of image layers for implementing a second set of services of the second container; and
   in response to determining that a specified image layer in the second set of image layers is not in the host device, acquiring the specified image layer from one or more other host devices in the host cluster.

17. The device according to claim 16, wherein acquiring the specified image layer from the one or more other host devices comprises:
  acquiring a topological structure representing a connection between the host device and a plurality of other host devices in the host cluster; and
  based on the topological structure, acquiring the specified image layer from the other host devices.

18. The device according to claim 16, wherein the actions further comprise: in response to determining that the specified image layer is not in the host cluster, acquiring the specified image layer from an image server connected to the host cluster.

19. An electronic device, comprising:
  at least one processor; and
  a memory coupled to the at least one processor and having instructions stored therein, wherein the instructions, when executed by the at least one processor, cause the electronic device to perform actions for managing an image of a container in a host device, and the actions include:
    receiving a first image of a first container, the first image comprising a first set of image layers for implementing a first set of services of the first container respectively;
    loading the first image to deploy the first container at the host device;
    based on an attribute of an image layer in the first set of image layers, setting an expiration time for the image layer; and
    in response to determining that the expiration time is reached, deleting the image layer from the host device;
    wherein setting an expiration time for the image layer comprises: setting the expiration time based on a size of the image layer, wherein the expiration time is directly proportional to the size.

20. A computer program product tangibly stored on a non-transitory computer-readable medium and comprising machine-executable instructions, wherein the machine-executable instructions are used to implement a method for managing an image of a container in a host device, the method comprising:
    receiving a first image of a first container, the first image comprising a first set of image layers for implementing a first set of services of the first container respectively;
    loading the first image to deploy the first container at the host device;
    based on an attribute of an image layer in the first set of image layers, setting an expiration time for the image layer; and
    in response to determining that the expiration time is reached, deleting the image layer from the host device;
    wherein the attribute of the image layer comprises at least one of a parallel providing number of the image layer and a number of copies of the image layer in a host cluster; and
    wherein the expiration time is determined at least in part as a function of the attribute of the image layer.

* * * * *